(12) United States Patent
Kitsukawa et al.

(10) Patent No.: US 7,096,489 B2
(45) Date of Patent: Aug. 22, 2006

(54) SYSTEM AND METHOD FOR INTERACTIVE TELEVISION

(75) Inventors: Tadamasa Kitsukawa, San Diego, CA (US); Tsutomu Akiyama, San Diego, CA (US); Shigeharu Kondo, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1024 days.

(21) Appl. No.: 09/839,482

(22) Filed: Apr. 21, 2001

(65) Prior Publication Data
US 2002/0088004 A1 Jul. 4, 2002

(51) Int. Cl.
*H04N 7/173* (2006.01)

(52) U.S. Cl. .................... 725/109; 725/38
(58) Field of Classification Search ............ 725/37–40, 725/42–49, 58
See application file for complete search history.

(56) References Cited

U.S. PATENT DOCUMENTS

| | | | |
|---|---|---|---|
| 5,289,271 A | 2/1994 | Watson ................... 725/15 |
| 5,377,357 A | 12/1994 | Nishigaki et al. ........ 720/303 |
| 5,410,344 A | 4/1995 | Graves et al. ............ 725/46 |
| 5,559,550 A | 9/1996 | Mankovitz ............... 725/41 |
| 5,661,517 A | 8/1997 | Budow et al. ............ 725/60 |
| 5,699,107 A | 12/1997 | Lawler et al. ............ 348/13 |
| 5,758,257 A | 5/1998 | Herz et al. ............... 455/2 |
| 5,798,785 A | 8/1998 | Hendricks et al. ........ 725/46 |
| 5,850,218 A | 12/1998 | LaJoie et al. ............ 345/327 |
| 5,867,154 A | 2/1999 | Berstis et al. ............ 725/788 |
| 5,911,306 A | 6/1999 | Ferrari ................... 198/836.1 |
| 5,914,746 A | 6/1999 | Matthews et al. ......... 725/132 |
| 5,926,207 A | 7/1999 | Vaughan et al. ........... 348/13 |
| 5,929,849 A | 7/1999 | Kikinis .................. 725/113 |
| 5,940,073 A | 8/1999 | Klosterman et al. ....... 345/327 |
| 5,973,685 A | 10/1999 | Schaffa et al. ........... 715/722 |
| 5,977,964 A | 11/1999 | Williams et al. .......... 715/721 |
| 5,978,828 A | 11/1999 | Greer et al. .............. 709/224 |
| 5,987,509 A | 11/1999 | Portuesi ................. 709/217 |
| 6,005,565 A | 12/1999 | Legall et al. ............. 715/721 |
| 6,025,837 A * | 2/2000 | Matthews et al. ......... 715/721 |
| 6,028,600 A | 2/2000 | Rosin et al. ............. 345/327 |
| 6,029,195 A | 2/2000 | Herz ..................... 709/219 |
| 6,061,082 A | 5/2000 | Park ...................... 725/14 |
| 6,072,483 A | 6/2000 | Rosin et al. ............. 345/335 |
| 6,088,722 A | 7/2000 | Herz et al. .............. 726/46 |
| 6,133,910 A | 10/2000 | Stinebruner ............. 725/49 |
| 6,141,003 A | 10/2000 | Chor et al. .............. 715/719 |

(Continued)

FOREIGN PATENT DOCUMENTS

CN 1236524 A 11/1999

(Continued)

*Primary Examiner*—Vivek Srivastava
(74) *Attorney, Agent, or Firm*—John L. Rogitz

(57) ABSTRACT

A system and method for interactive television (ITV) includes presenting both TV channels and "virtual channels" on an ITV. A virtual channel can be a Web page stored in memory of the ITV (or remote therefrom) and accessed by a microprocessor in the ITV when a user selects the virtual channel number using a conventional TV remote control. The particular Web page can be established based on consumer data, such as demographic data supplied by the consumer or consumer responses to prompts displayed along with a channel. The Web page associated with the virtual channel can be updated or changed by sending data to the ITV through the VBI of a TV signal or via the Internet, through a modem on the ITV.

9 Claims, 2 Drawing Sheets

U.S. PATENT DOCUMENTS

| | | | | |
|---|---|---|---|---|
| 6,144,376 | A * | 11/2000 | Connelly | 725/44 |
| 6,144,402 | A | 11/2000 | Norsworthy et al. | 725/109 |
| 6,177,931 | B1 * | 1/2001 | Alexander et al. | 725/52 |
| 6,195,692 | B1 | 2/2001 | Hsu | 709/219 |
| 6,199,206 | B1 | 3/2001 | Nishioka et al. | 725/51 |
| 6,219,042 | B1 | 4/2001 | Anderson et al. | 345/327 |
| 6,219,839 | B1 | 4/2001 | Sampsell | 725/40 |
| 6,240,555 | B1 | 5/2001 | Shoff et al. | 725/110 |
| 6,260,192 | B1 | 7/2001 | Rosin et al. | 725/39 |
| 6,317,881 | B1 | 11/2001 | Shah-Nazaroff et al. | 725/24 |
| 6,326,982 | B1 | 12/2001 | Wu et al. | 345/718 |
| 6,367,080 | B1 | 4/2002 | Enomoto et al. | 725/112 |
| 6,374,404 | B1 | 4/2002 | Brotz et al. | 725/46 |
| 6,397,387 | B1 | 5/2002 | Rosin et al. | 345/327 |
| 6,434,747 | B1 * | 8/2002 | Khoo et al. | 725/46 |
| 6,469,753 | B1 * | 10/2002 | Klosterman et al. | 348/552 |
| 6,493,688 | B1 * | 12/2002 | Das et al. | 706/20 |
| 6,526,577 | B1 | 2/2003 | Knudson et al. | 725/40 |
| 6,584,613 | B1 | 6/2003 | Dunn et al. | 725/122 |
| 6,637,027 | B1 | 10/2003 | Breslauer et al. | 725/25 |
| 6,681,393 | B1 | 1/2004 | Bauminger et al. | 725/23 |
| 6,698,023 | B1 * | 2/2004 | Levitan | 725/135 |
| 6,738,978 | B1 | 5/2004 | Hendricks et al. | 725/35 |
| 6,742,033 | B1 | 5/2004 | Smith et al. | 709/224 |
| 6,745,223 | B1 | 6/2004 | Nobakht et al. | 709/200 |
| 6,756,997 | B1 | 6/2004 | Ward et al. | 715/716 |
| 6,766,524 | B1 | 7/2004 | Matheny et al. | 725/23 |
| 6,809,776 | B1 * | 10/2004 | Simpson | 348/565 |
| 6,859,937 | B1 | 2/2005 | Narayan et al. | 725/37 |
| 2002/0056081 | A1 * | 5/2002 | Morley et al. | 725/1 |
| 2002/0088004 | A1 | 7/2002 | Kitsukawa | 725/110 |
| 2002/0129376 | A1 | 9/2002 | Tadamasa et al. | 725/110 |
| 2002/0144258 | A1 | 10/2002 | Kitsukawa | |
| 2002/0144288 | A1 | 10/2002 | Kitsukawa | |
| 2002/0144289 | A1 | 10/2002 | Taguchi et al. | 725/112 |
| 2002/0152464 | A1 | 10/2002 | Tadamasa et al. | 725/46 |
| 2002/0157092 | A1 | 10/2002 | Kitsukawa | 725/90 |
| 2002/0157100 | A1 | 10/2002 | Tadamasa et al. | 725/56 |
| 2002/0157107 | A1 | 10/2002 | Tadamasa et al. | 725/109 |
| 2002/0157108 | A1 | 10/2002 | Kitsukawa | 725/109 |
| 2002/0157109 | A1 | 10/2002 | Masahiro et al. | 725/110 |
| 2002/0174425 | A1 | 11/2002 | Markel et al. | 725/13 |
| 2004/0103439 | A1 | 5/2004 | Macras et al. | 725/109 |
| 2004/0117831 | A1 | 6/2004 | Ellis et al. | 725/53 |
| 2004/0249726 | A1 | 12/2004 | Limehan | 725/110 |
| 2005/0155056 | A1 | 7/2005 | Knee et al. | 726/35 |

FOREIGN PATENT DOCUMENTS

| | | |
|---|---|---|
| EP | 1 039 399 A1 | 12/1999 |
| EP | WO 02/087220 A2 | 10/2002 |
| WO | WO 97/42763 | 11/1997 |
| WO | WO 98/56188 | 12/1998 |
| WO | WO 02/19689 A2 | 3/2002 |
| WO | WO 02/086691 A1 | 10/2002 |
| WO | WO 02/087239 A1 | 10/2002 |

\* cited by examiner

ITV System

ITV Set

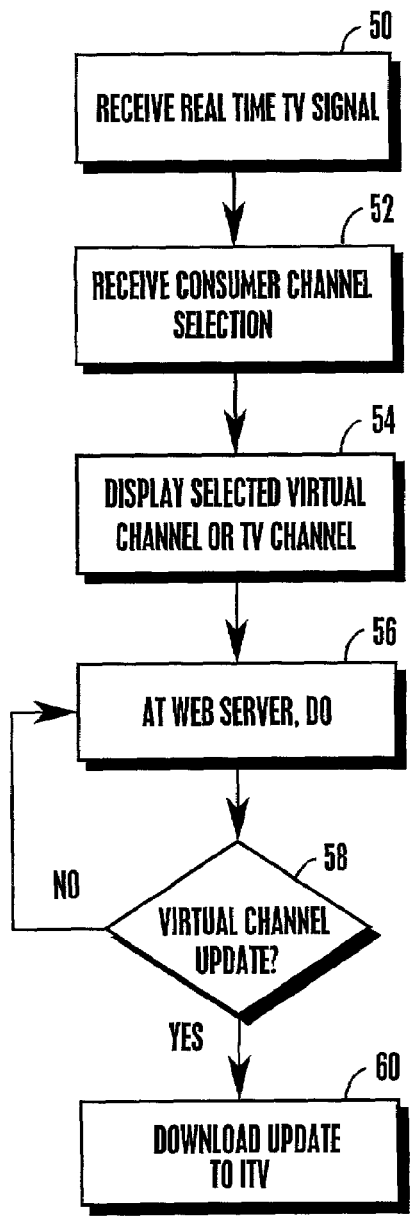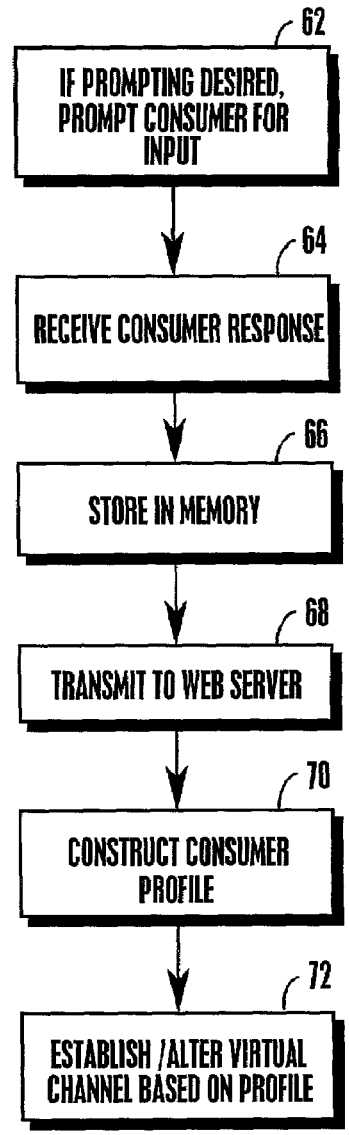
FIG. 3
OVERALL METHOD
FIG. 4
ESTABLISHING CONSUMER PROFILE

SYSTEM AND METHOD FOR INTERACTIVE TELEVISION

BACKGROUND OF THE INVENTION

1. Field of the Invention

The present invention relates generally to television systems.

2. Description of the Related Art

Televisions are ubiquitous, as are Internet computers. Currently, however, consumers typically purchase and use two separate systems to enjoy television and Internet access. Namely, consumers must purchase a television to watch television, and a computer to access the Internet. One result not only is that costs are duplicated and significant space is required, but also that undertaking both activities at once, in one room, can be difficult.

Moreover, the need for two systems burdens some consumers who, while familiar with operating a television and its remote control, might not be familiar with operating an Internet computer. Nonetheless, while perhaps not requiring comprehensive Internet support, such consumers can still benefit from advantages provided by simple, straightforward, intuitive Internet interaction. For example, many consumers might only desire easy access to a weather site or traffic site for obtaining up-to-date information before proceeding to work in the morning, without having to know a great deal about how to operate a Web browser. As recognized herein, it consequently would be advantageous to provide an Internet access appliance that is easy and intuitive to use, for instance one that could be used like a television remote control.

To the extent that attempts have been made to combine television with Internet features, the above-noted consumer needs have remained unfulfilled. For instance, in the system known as "WebTV", preselected Internet pages are loaded once into a television during manufacture and never subsequently updated, with the preselected pages being accessible through the television using a computer keyboard with its attendant complexity. Since the pages are not updated, however, many Internet-related features such as up-to-date traffic, weather, and news, are not immediately available. Instead, the consumer must access a central site using one of the preselected pages, and then be redirected to a desired Web page. In terms of currently expected speeds of Internet access, this consumes an undue amount of time. Furthermore, it requires browser or browser-like operations that must be initiated by a consumer who might only wish to turn on the television and immediately access up-to-date information using the relatively simple TV remote control without further ado.

Still further, current systems provide the same preselected Web pages to all consumers. As understood herein, it would be advantageous to tailor, for each consumer, what Web pages are provided in a television to that particular consumer. In this way, a consumer is much more likely to gain useful and enjoyable Internet access than he or she would be able to gain otherwise.

Additionally, as mentioned above, in the above-mentioned WebTV system, a keyboard is required for user input to access Web sites. For television functions, however, consumers are accustomed to using a much simpler input device, namely, a remote control. Thus, existing systems that attempt to integrate television and Internet computers do not do so seamlessly, but rather require the operation of two separate systems that happen to be housed together and that require two separate input devices. This complicates matters for the consumer, and is confusing. The object of the present invention is to address one or more of the above-noted consumer needs.

SUMMARY OF THE INVENTION

A method for enabling a consumer to access the Internet using a television that has a television tuner includes configuring the television to have plural television channels and at least one virtual channel. The virtual channel represents a Web page. Periodically, updates to the Web page are sent to the television, such that the virtual channel is periodically updated.

In a preferred embodiment, content of the virtual channel is stored in memory within the television. Alternatively, content of the virtual channel is stored in memory remote from the television. In any case, updates to virtual channels can be sent via a DSL, or via a cable modem line or other Internet or network connection, wired or wireless, or via a vertical blanking interval (VBI) of a television signal.

The presently preferred method can include receiving consumer input via a conventional television control device in response to a prompt in the vertical blanking interval (VBI) of a TV channel or in a virtual channel. Other input devices can be used. Using the input, a consumer profile is established. Using the consumer profile, the virtual channels are established or updated. The input can be received and stored in memory inside the television at a first time, and then transmitted to a site remote from the television at a second time.

In another aspect, a method for presenting television signals and Web pages on a single interactive television (ITV) includes detecting television signals at a television tuner supported on the ITV. In response to a user channel selection, a television channel or a Web page is presented on the ITV, with the Web page being associated with a virtual channel. The Web page that is associated with the virtual channel can be changed or updated, such that a first version of the Web page is displayed via the virtual channel at a first time, and a second version of the Web page is displayed via the virtual channel at a second time.

In yet another aspect, a method is disclosed for presenting TV channels and Web pages establishing virtual channels on an interactive TV (ITV). The method includes receiving consumer input via a conventional TV control device, and establishing virtual channels based on the consumer input. The method also includes displaying either a TV channel or a virtual channel based on a user channel selection.

In still another aspect, a method for presenting TV channels and Web pages that establish virtual channels on an interactive TV (ITV) includes receiving consumer data, and establishing a virtual channel based on the consumer data. Either a TV channel or a virtual channel is displayed based on a consumer channel selection.

BRIEF DESCRIPTION OF THE DRAWINGS

The details of the present invention, both as to its structure and operation, can best be understood in reference to the accompanying drawings, in which like reference numerals refer to like parts, and in which:

FIG. 3 is a flow chart of the overall method of the present invention; and

FIG. 4 is a flow chart of the method for establishing and/or changing virtual channels.

DETAILED DESCRIPTION OF THE PREFERRED EMBODIMENTS

Figure 1:
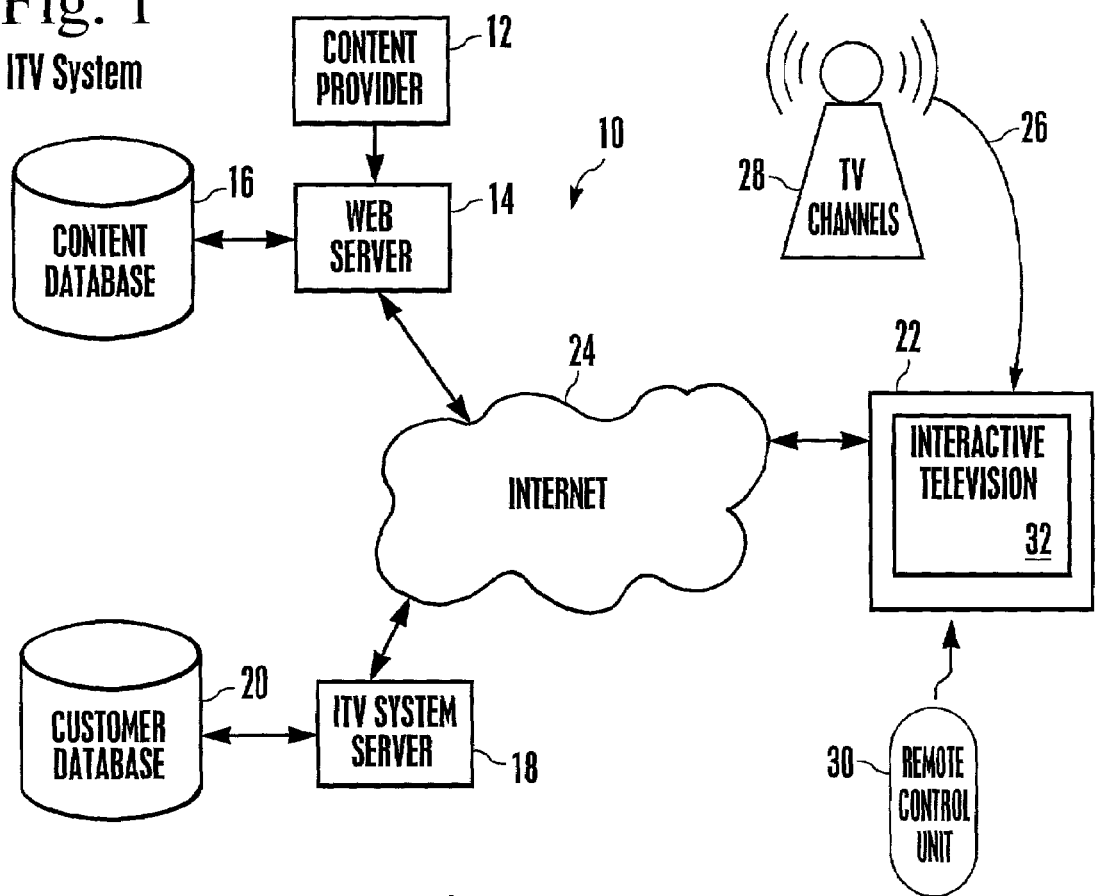
FIG. 1 is a block diagram of the interactive television (ITV) system of the present invention.

Referring initially to FIG. 1, an interactive television (ITV) system is shown, generally designated 10. As show, the system 10 includes one or more content providers 12 that provide various types of content to one or more Web servers 14 (only one content provider 12 and one Web server 14 shown for clarity of disclosure). The Web server 14 accesses a content database 16 for storage of data therein. The content on the Web server 14 can be any appropriate content, including but not limited to hypertext markup language (HTML) pages, .jpeg and .gif image files, .avi and .mpeg movie files, audio files, streaming video, and so on.

In one preferred embodiment, the system 10 also includes an ITV system server 18, which can be, e.g., a Sony Corporation Web portal. The ITV system server 18 can be a Web server computer that accesses a customer database 20. As described further below, the customer database 20 can store customer or consumer profiles that can be used to tailor virtual channels to a profile. Essentially, a virtual channel is downloaded content that is given a number, like conventional TV channels, e.g., a channel number at the end of the sequence of available TV channels. A virtual channel, once its channel number has been selected by the consumer using a TV remote control device, is displayed as a Web page or series of Web pages on the below-described ITV. In one implementation, the content of the virtual channels is stored in memory that is on board the ITV and that is periodically updated via the Internet, or the vertical blanking interval (VBI) of a conventional TV signal. In another implementation, the virtual channel content is stored remote from the ITV, e.g., at a Web server, and is streamed real-time to the ITV via a high-speed Internet access connection.

The servers 14, 18 of the present invention can be implemented by any appropriate computer, such as Internet server computers, personal computers, laptop computers, mainframe computers, and the like. The servers 14, 18 access software to execute portions of the present invention.

Plural consumer ITVs 22 (only a single ITV 22 shown for clarity) access the servers 14, 18 via the Internet 24. Also, each consumer ITV 22 receives television signals 26 from a source 28 of television signals. The source 28 can be plural broadcasters, or a cable television company, or a satellite dish, and so on. A conventional hand-held television remote control unit 30 can be manipulated by a consumer as the consumer views a display area 32 of the ITV 22 to input various selections to the ITV 22 in accordance with disclosure below. It will be appreciated that the remote control unit 30 is not a keyboard or keypad that is associated with a computer. Rather, it is a conventional remote TV control that has numeric buttons, up/down and left/right buttons, and a power button, as well as other buttons that might be conventionally provided on a TV remote control. The functions of the remote unit 30 can also be undertaken by conventional TV buttons on the ITV 22 itself. However, keyboards, keypads, motion-sensing (gesture) devices, and voice recognition input devices can also be used.

Figure 2:
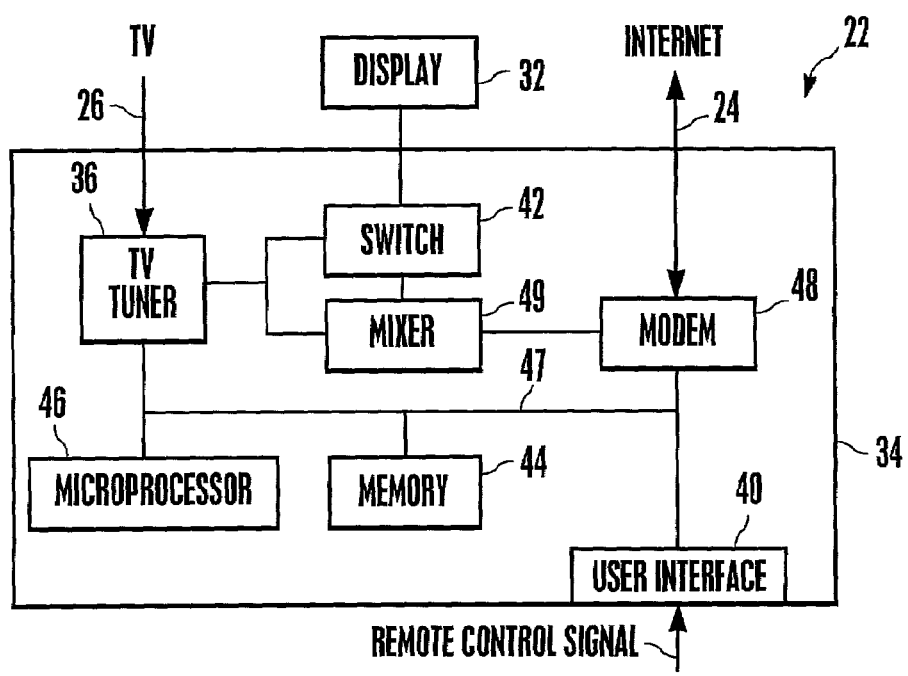
FIG. 2 is a block diagram of the ITV of the present invention.

Now referring to FIG. 2, the ITV 22 is shown. While the embodiment below discusses an ITV 22 with a single housing that supports not only the display but also the microprocessor, virtual channel memory, and in general all of the electrical components shown in FIG. 2, it is to be understood that the term "interactive television" encompasses any apparatus that has a television tuner and the below-described virtual channel capability. For instance, the term "ITV" encompasses the single-housing television shown in FIG. 2, as well as a conventional television in combination with a set-top box that functions in accordance with the present invention. In the latter example, the set-top box might include, e.g., the microprocessor and memory discussed below.

As shown in FIG. 2, the ITV 22 includes a housing 34 that holds a conventional television tuner 36. The TV tuner 36 receives the TV signals 26 and outputs them to a two-position switch 42, which in turn is controlled by a user interface 40 to output a consumer-selected TV channel (in a first position) or virtual channel (in a second position) to the display 32 of the ITV 22. It is to be understood that the user interface 40 can include an infrared receiver or other receiver for sensing remote control signals from the remote control 30. Also, the user interface 40 can include a visual portion, such as but not limited to a cursor that can be moved, by means of the remote control 30, across an electronic channel guide, Web page icon, and so on that are presented on the display 32, to enable a consumer to select a channel for display.

As mentioned above, not only can a consumer select a TV channel, but a virtual channel as well. In accordance with the present invention, a "virtual channel" is not a TV channel per se, but rather a Web-based channel that can be stored in a memory or other data storage 44 in the housing 34. That is, the memory or other data storage 44 can be computer memory, or a hard disk drive, optical drive, solid state storage, tape drive, or any other suitable data storage medium.

A microprocessor 46 is also supported in the housing 34 to execute the logic steps set forth below, with the microprocessor 46, memory 44, TV tuner 36, and switch 42 all being accessible via an internal data bus 47. The microprocessor 46 assigns channel numbers to virtual channels or otherwise maintains a table of channel numbers versus TV channels and virtual channels. Accordingly, when, for instance, an electronic channel guide is displayed on the display 32 of the ITV 22, the virtual channels are listed, typically at the end of the guide after the conventional TV channels, by channel number and by name.

Alternatively, the virtual channels can be stored in a location remote from the ITV 22, e.g., they can be stored at the ITV system server 18, for display of the channels (upon consumer selection thereof) real-time via the Internet (or other network) when data transfer rates are sufficiently high to support such real-time transfer. In any case, the ITV 22 includes a modem 48 that communicates with the Internet 24. The modem 48 can be a cable modem, conventional twisted pair wire modem, DSL, wireless modem, or other appropriate communication device. It is to be understood that a single high data rate cable (e.g., either wire or optical fiber) can be provided to carry both Internet data and TV signals.

In any case, the modem 48 outputs a signal to a mixer 49, which can mix the Web-based signal from the modem 48 with related signals from the TV tuner 36. For instance, if a virtual channel of a cable newscast is selected, the Web-based content can be combined with an actual broadcast newscast from the associated news station for simultaneous display of the newscast in a window of the virtual channel. The signal from the mixer 49 is sent to the switch 42 and thence to the display 32 when the user selects a virtual channel. The mixer 49 can be established by a "Geode" chip made by National Semiconductor. As mentioned above, one or more of the microprocessor 46, memory 44, modem 48, mixer 49, and switch 42 can be housed in a set-top box that is electrically connected to a separate television housing which houses the tuner 36 and display 32.

It may now be appreciated that the microprocessor 46 controls the functions of the ITV 22 in accordance with the logic below. The flow charts herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device.

Now referring to FIG. 3, the overall logic can be seen. Commencing at block 50, real time TV signals 26 are received at the tuner 36. Assuming the ITV 22 is energized, at block 52 consumer channel selections are received by means of the user interface 40, and these channel selections are available to the microprocessor 46. Based on the selections, the microprocessor 46 controls the switch 42 to display the selected TV channel or virtual channel at block 54.

When a virtual channel is selected, the microprocessor 46 retrieves the associated Web page from the memory 44 for display of the channel. The memory 44 can also store program memory and user data input memory. When the content of the virtual channel is stored at a Web server 14 that is remote from the ITV 22 (when, for instance, the ITV 22 has high speed Internet access), the microprocessor 46 retrieves the associated Web page directly from the particular server for display of the channel. Accordingly, in the preferred embodiment the ITV 22 can directly access Web servers 14 other than the ITV system server 18.

In accordance with the present invention, the virtual channels are not simply Web pages that remain static for the life of the ITV 22. Instead, they are periodically updated as the underlying Web pages on the respective Web servers 14 are updated. Accordingly, the logic moves from block 54 to block 56 wherein a DO loop is entered at either one or both of the Web server 14 and ITV system server 18. This DO loop can be entered periodically, or it can be entered in response to a user-induced or automatically induced command from the microprocessor 46, sent via the Internet 24.

At decision diamond 58, it is determined, for each virtual channel, whether an update at the corresponding Web site has occurred. The determination at decision diamond 58 can be made by the server 14/18, assuming the server knows the current content of the virtual channels of the ITV 22 (normally the case when the virtual channels are stored at a server remote from the ITV), or it can be made by the microprocessor 46 (normally the case when the virtual channels are stored in the local memory 44). For instance, the server 14/18 can send information pertaining to the update to the microprocessor 46, which can then determine whether the memory 44 stores the latest version of the virtual channel under test. If it does, the logic loops back to block 56. In the event of an update, however, the logic moves to block 60 to download the entire new Web page or pages that establish the virtual channel or, more preferably to download only the changed portions thereof.

The download can be sent via the TV signal 26 in the VBI of the signal, or it can be sent via the Internet 24 (or other network) and modem 48 (by means of a DSL or cable modem line or wireless modem line) to the memory 44. In any case, the virtual channels are periodically updated.

FIG. 4 shows the logic undertaken by the microprocessor 46 for establishing or changing what virtual channels are available to a particular ITV 22. Commencing at block 62, if it is desired to prompt the consumer for input, a prompt is displayed. The prompt can be displayed in a channel being viewed by sending the prompt through the VBI of a viewed TV channel or through the Internet when viewing a virtual channel. Alternatively, user channel selections are recorded and used in developing a user profile.

Moving to block 64, the consumer's response is received. The response is ordinarily input by means of the remote control unit 30, although other input devices as discussed above can be used. Accordingly, a prompt might ask a consumer directly what types of virtual channels are of interest. Or, it might ask about the consumer's personal preferences on a number of topics, or about the consumer's personal demographics.

In any case, the response is stored in memory at block 66. Moving to block 68, the response is transmitted to one of the servers 14, 18 (typically to the ITV system server 18). The transmission is via the Internet, and it can be undertaken sometime after the consumer input is stored, e.g., during a low-usage time period. Alternatively, when the ITV 22 is continuously in communication with the Internet, the response can be sent immediately after it is received by the microprocessor 46, without first storing it.

Then, at block 70 a consumer profile can be constructed by the server 18 based on the consumer's responses, using models known in the art to predict what types of content the consumer might desire in the virtual channels of the ITV 22. At block 72, the profile is used to establish and/or alter the virtual channels of the ITV 22 by downloading new content via the VBI or modem 48.

While the particular SYSTEM AND METHOD FOR INTERACTIVE TELEVISION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

The invention claimed is:

1. A method for enabling a consumer to access the Internet using a television having at least one television tuner, comprising:
   configuring the television to have plural television channels and at least one virtual channel, the virtual channel representing a Web page;
   providing a mixer receiving the television channels and virtual channel;
   providing a switch receiving an output of the mixer; and
   configuring the switch to pass either a television channel or the virtual channel, but not both, to a display based at least in part on a user channel selection of the television channel or the virtual channel.

2. The method of claim 1, wherein content of the virtual channel is stored in memory within the television.

3. The method of claim 1, wherein content of the virtual channel is stored in memory remote from the television.

4. The method of claim 1, wherein updates to the virtual channel are sent via a DSL.

5. The method of claim 1, wherein updates to the virtual channel are sent via a cable modem line.

6. The method of claim 1, wherein updates to the virtual channel are sent via at least one vertical blanking interval (VBI) of a television signal.

7. The method of claim 1, further comprising:
   receiving consumer input via a conventional television control device;
   using the input, establishing a consumer profile; and
   using the consumer profile, establishing at least one virtual channel or updating at least one virtual channel on the television.

8. The method of claim 7, wherein the input is received and stored in memory inside the television at a first time, and then transmitted to a site remote from the television at a second time.

9. The method of claim 1, wherein the act of sending updates includes:
   sending information pertaining to at least one update to the television; and
   at the television, using the information to determine whether to download the update to the television.

* * * * *